Figure 1:
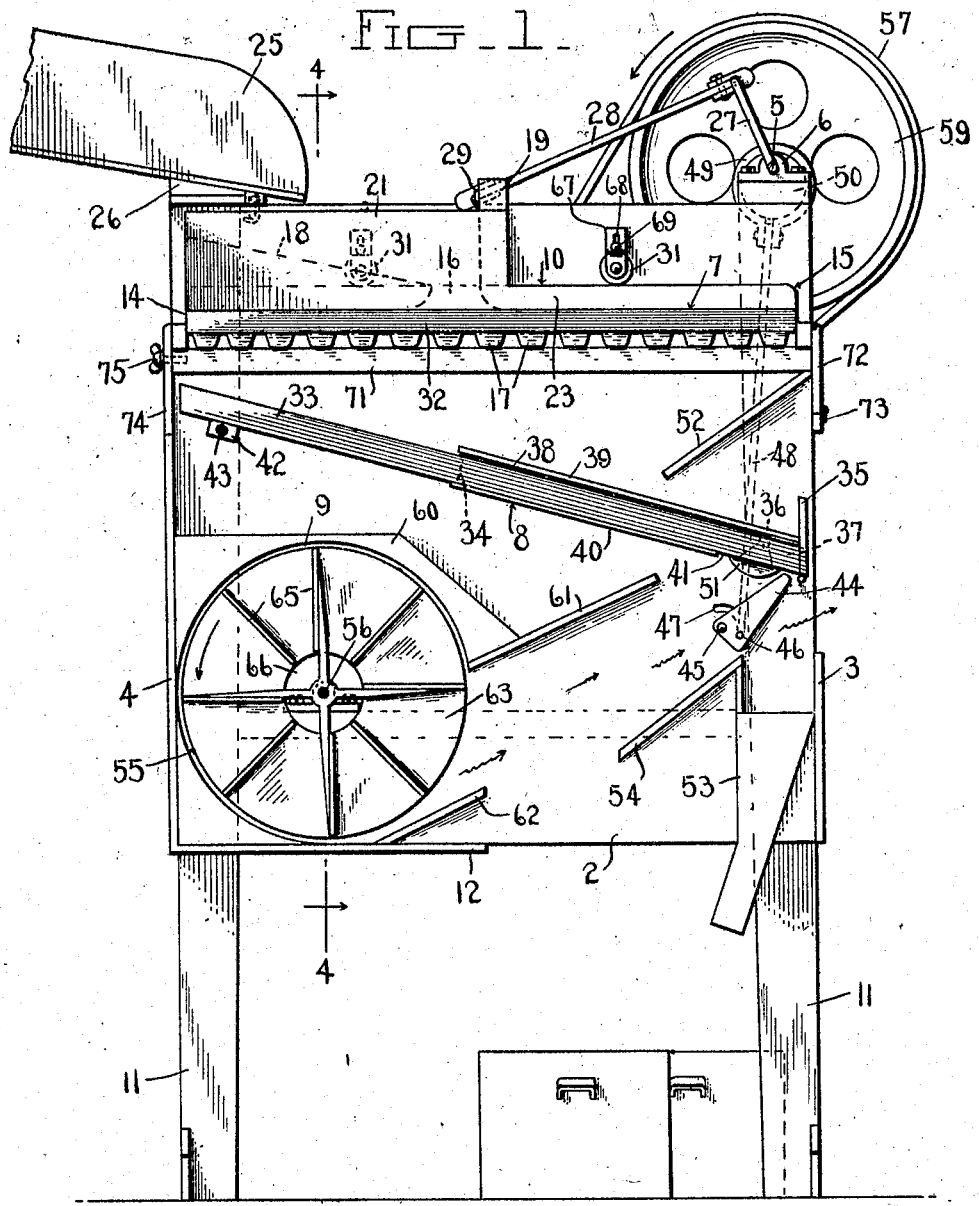

R. M. NEWLAND.
PEANUT SHELLING MACHINE.
APPLICATION FILED JAN. 31, 1908.

941,686.

Patented Nov. 30, 1909.
5 SHEETS—SHEET 1.

Witnesses
L. B. James
H. C. McCartney

Inventor
R. M. Newland
By Chandler & Chandler
Attorneys

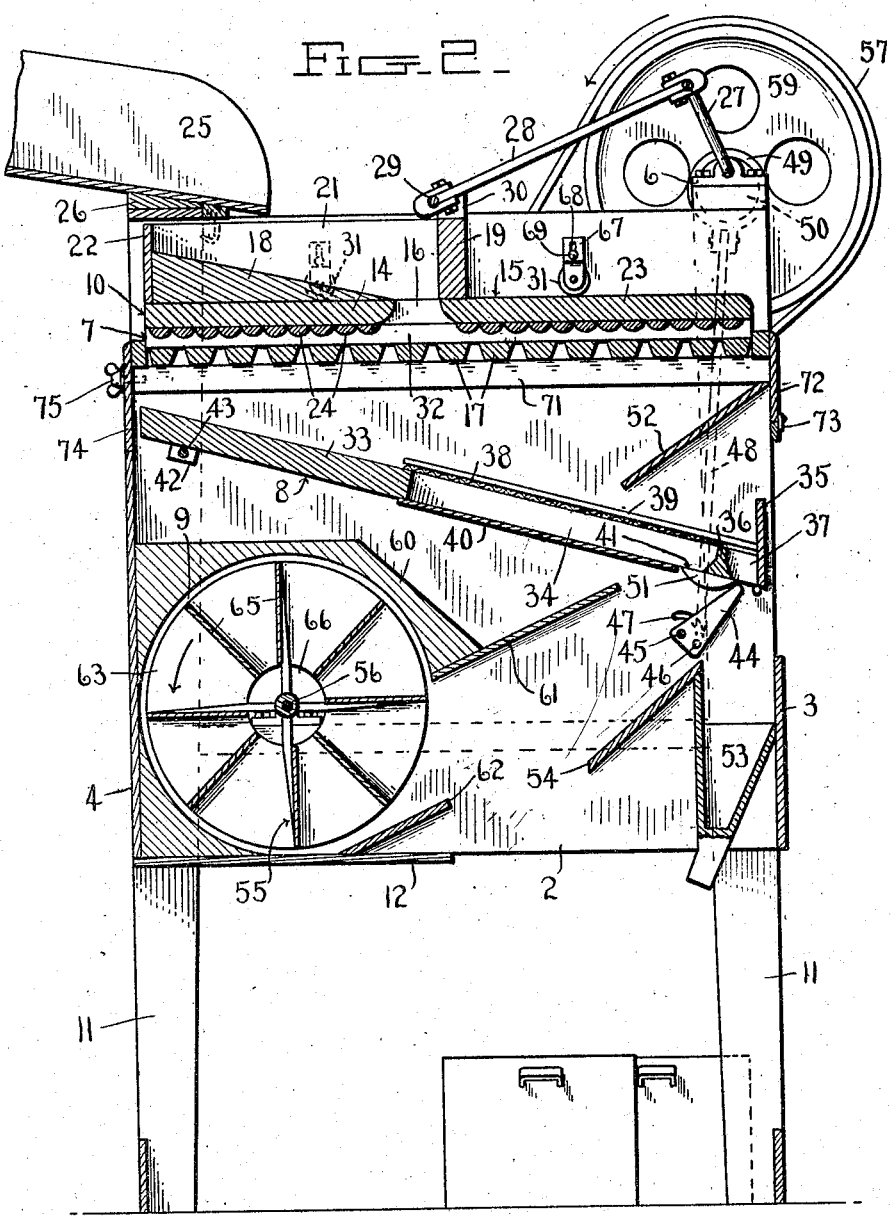

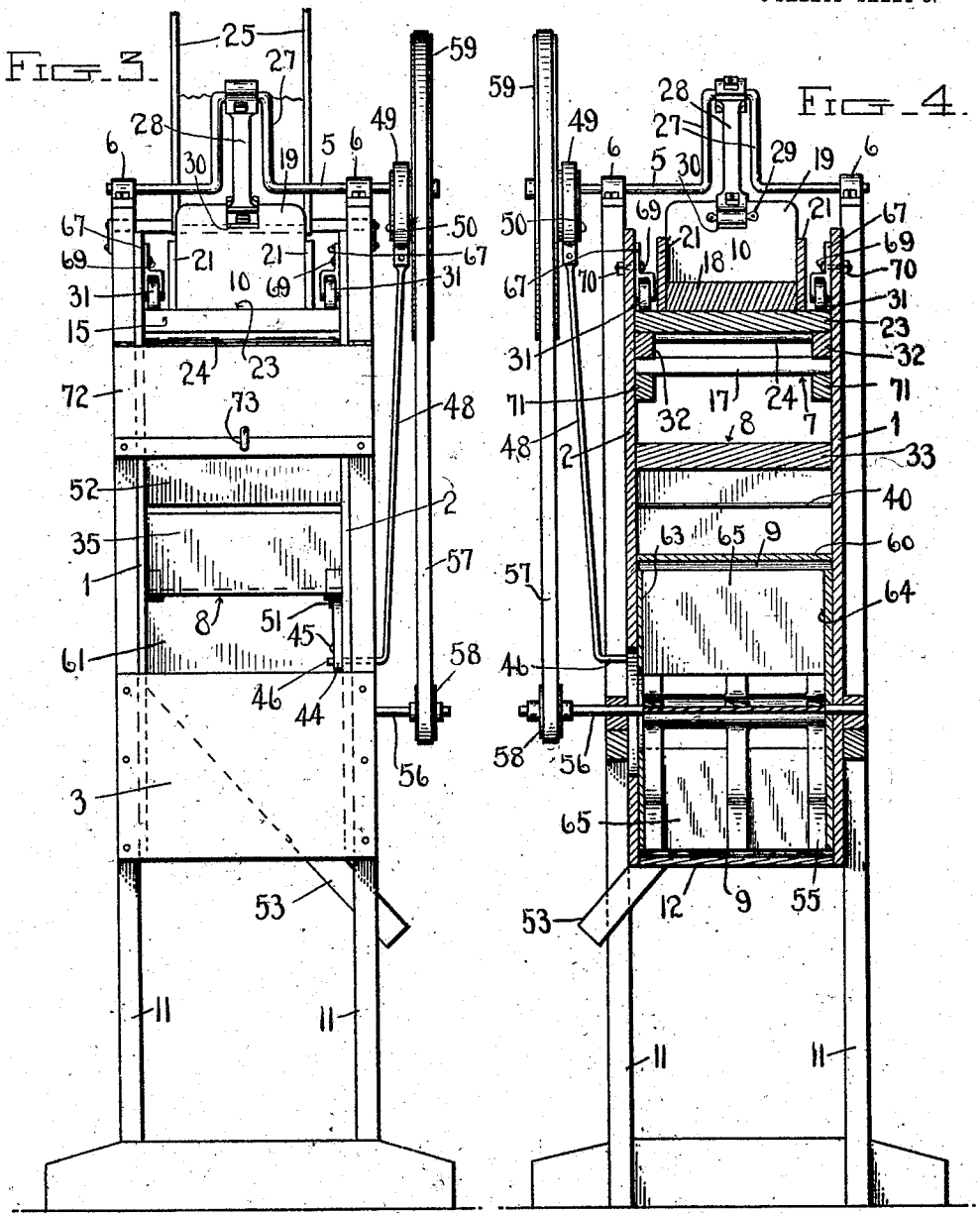

R. M. NEWLAND.
PEANUT SHELLING MACHINE.
APPLICATION FILED JAN. 31, 1908.
941,686.
Patented Nov. 30, 1909.
5 SHEETS—SHEET 4.
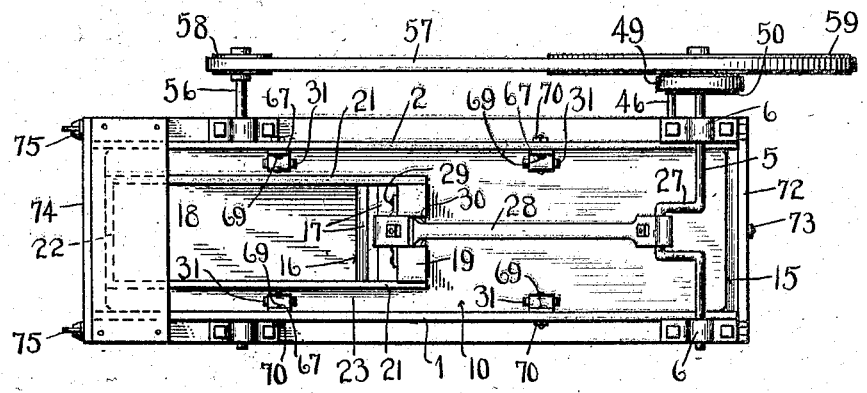
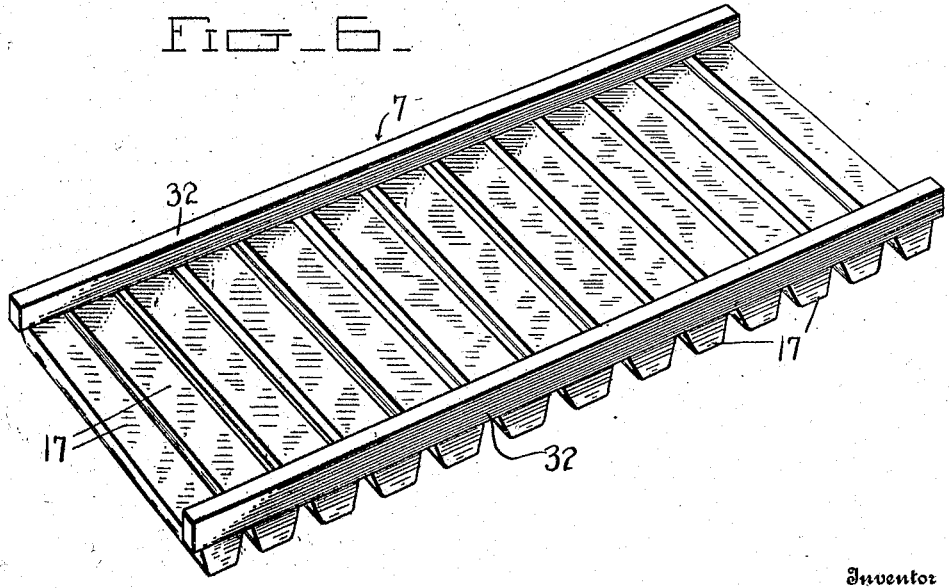
Witnesses
L. B. James
H. C. McCartney
Inventor
R. M. Newland
By Chanabus Chandler
Attorneys R. M. NEWLAND.
PEANUT SHELLING MACHINE.
APPLICATION FILED JAN. 31, 1908.
941,686.
Patented Nov. 30, 1909.
5 SHEETS—SHEET 5.
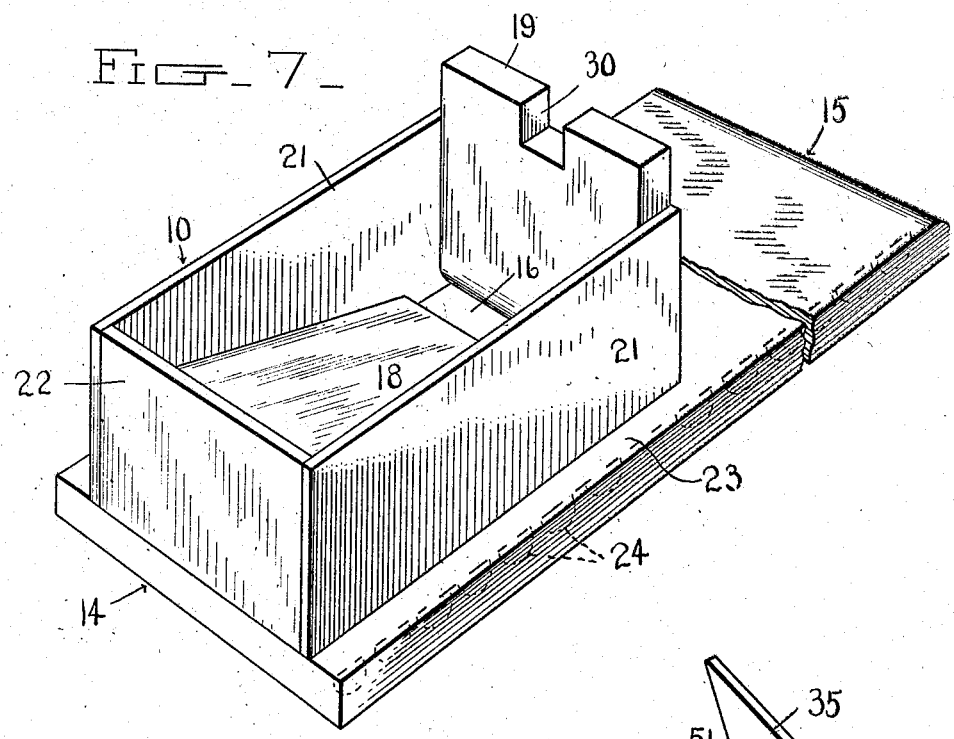
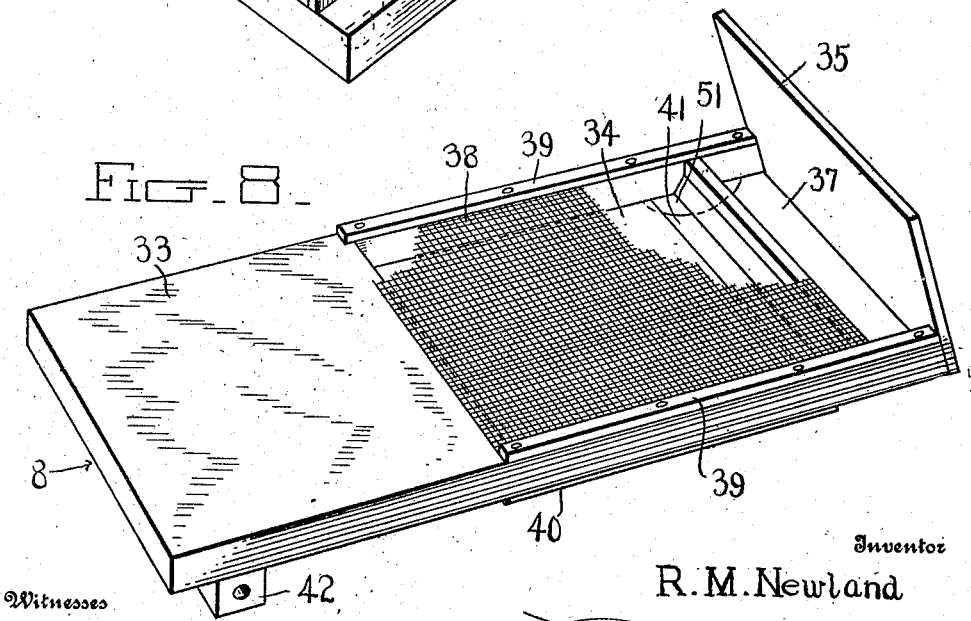
Witnesses
L. B. James
N. C. McCartney
Inventor
R. M. Newland
By Chandler & Chandler
Attorneys

UNITED STATES PATENT OFFICE.

ROBERT M. NEWLAND, OF SEAFORD, DELAWARE.

PEANUT-SHELLING MACHINE.

941,686.  Specification of Letters Patent.  Patented Nov. 30, 1909.

Application filed January 31, 1908. Serial No. 413,662.

*To all whom it may concern:*

Be it known that I, ROBERT M. NEWLAND, a citizen of the United States, residing at Seaford, in the county of Sussex, State of Delaware, have invented certain new and useful Improvements in Peanut-Shelling Machines; and I do hereby declare the following to be a full, clear, and exact description of the invention, such as will enable others skilled in the art to which it appertains to make and use the same.

The present invention relates to peanut shelling machines and it aims, generally, to provide an exceedingly simple, inexpensive and efficient machine of that type of shelling machine which includes a grate, a rubber movable across the grate bars and a movable screen disposed beneath the grate. Machines of this type, however, are generally defective, in that an insufficient separation of the nuts from the shells is caused by the mounting of the screen in such a manner as to be capable merely of an endwise reciprocation in a virtually horizontal plane, such movement failing to shake the nuts and shells which fall on the screen through the spaces between the grate bars to permit the nuts to pass through the meshes of the screen and fall onto the usual discharge chute. In other words, it has been found necessary in shelling machines of this type to impart a series of shocks in rapid succession to the screen in order to effectively separate the nuts and shells.

It is the primary object of this invention therefore, to provide a shelling machine in which the screen is not only subjected to a series of shocks from an oscillating member, but is also so disposed within the machine casing as to present an inclined surface along which the nuts and shells travel, thus materially assisting the separation, the shaking devices being located at the free end of the screen below the plane of its horizontal pivot, which latter is located at the upper end of the screen.

The invention further resides in the particular construction of the screen; in the particular devices employed for shaking the screen; and in the particular manner in which such devices are mounted and are operated.

The invention further contemplates the provision of an improved rubber, comprising front and rear members arranged in spaced relation to each other, the rear member being provided with a chute to direct the material to be shelled into the space between said members, and the front member having formed thereon an upstanding shoulder connected by a pitman with the cranked main drive shaft of the machine.

The invention still further resides in the provision of rollers which are secured to the inner walls of the front and rear sides of the machine and are adapted to contact with the adjacent longitudinal edges of the rubber, to hold the latter in place and prevent upward movement thereof during its travel.

The invention finally resides in the specific construction of the grate, and its disposition within the machine casing in such a manner as to permit its removal therefrom.

The above mentioned and other features which comprise the subject matter of this case will be readily understood from a consideration of the following detailed description, and their preferred embodiment is illustrated in the accompanying drawings, in which corresponding parts are designated by similar reference numerals in the several views.

Of the said drawings:—Figure 1 is a front elevation of the improved shelling machine. Fig. 2 is a vertical section therethrough. Fig. 3 is an end elevation. Fig. 4 is a transverse vertical section taken on the line 4—4 of Fig. 1. Fig. 5 is a top plan view. Figs. 6, 7 and 8 are enlarged perspective views respectively of the grate, the rubber and the screen.

In Fig. 1, the front wall of the machine frame is removed for clearness of illustration.

The machine shown in said drawings, comprises a frame having front and rear walls or sides 1 and 2, and end walls 3 and 4; the main drive shaft 5 journaled in bearings 6 mounted upon the upper edges of the sides at one end of the frame; a grate 7 disposed in the upper portion of the frame directly above the screening member 8; a partially inclosed fan chamber 9 located in the bottom of the frame; and a reciprocatory rubber 10 movable across the bars of the grate. The machine frame itself is supported upon legs 11 which are arranged at the corners thereof and are secured in any preferred manner to the bottom wall 12 of said frame.

The rubber, which, with the screen includes the more important features of the case, comprises, as shown in Fig. 7, a rear member 14 and a front member 15, whose mutually-adjacent inner ends are rounded and are disposed in spaced relation to each other to provide a feed opening 16 through which the material to be shelled passes onto the bars 17 of the grate, the rear member being provided with a chute 18 secured to the upper face thereof and having its lower edge coinciding with the rear wall of the feed opening. The front member 15 is provided at its inner end with an upstanding shoulder 19, whose width, however, is somewhat less than that of the rubber, the side edges of said shoulder being connected by plates 21 with a plate 22 secured to the rear end of the chute 18, the lower edges of said plates resting upon the body portion 23 of the rubber and forming, as it were, the walls of a hopper whose outlet is formed by the opening 16. Each member of the hopper has secured to its under face, a series of spaced transverse ribs 24 semicircular in cross section.

The material to be shelled is fed to the hopper formed by the plates 21 and 22 and the shoulder 19, as above described, from a second hopper 25 which is inclined thereto and rests upon a wedge-shaped supporting block 26, carried by the wall 4 of the frame and the adjacent ends of the sides 1 and 2 as shown in Figs. 1 and 2.

The reciprocation of the rubber is effected from the main drive shaft 5, which latter is driven from any source of power (not shown), said drive shaft being provided with a crank portion 27, which is connected by a pitman 28 with a horizontal pin 29 which is secured to the rear wall of the shoulder 19, adjacent the upper edge thereof, said shoulder being notched at such point as indicated by the numeral 30 in Fig. 7, to facilitate the attachment of the pitman to said pin. Rotation of the drive shaft will therefore effect an endwise reciprocation of the rubber as a whole across the grate bars, during which movement the rubber is held against displacement by rollers 31 which are loosely mounted upon pins supported as hereinafter described, the rollers on one wall being disposed directly opposite those on the other wall. These rollers bear upon the upper face of the body portion 23 of the rubber and thus prevent any upward movement and consequent displacement of the latter.

In the operation of the machine, as so far described, the peanuts or other material to be shelled will be discharged from the hopper 25 onto the chute 18 carried by the rear member of the rubber, whence they pass through the opening 16 and fall upon the grate bars. The movement of the rubber across the bars will therefore split the shells, which latter with the nuts, thus freed therefrom, will pass through the spaces between the grate bars 17, and will fall upon the screen member 8, the bars of the grate being likewise disposed transversely thereof and in spaced relation to each other, as will be understood, said bars being secured at opposite ends to the rails 32, which form the grate frame; (see Fig. 6).

The screening member, which is disposed directly beneath the grate, has a downward inclination as shown in Fig. 2, and comprises a solid upper section 33 and a hollow lower member 34, the last mentioned member having its side rails formed by extensions of the upper member, as shown in Fig. 8, said rails being connected at their free ends by an upwardly inclined plate 35, and being further connected by a transverse rib 36 which is parallel with said plate and is disposed a slight distance to the rear thereof to provide an outlet opening 37 hereinafter referred to. The upper faces of the side rails of said lower section are connected by a strip of wire gauze or other foraminous material 38 secured thereto by cleats 39, while their lower edges are in turn, connected by a sheet metal plate 40, the front edge of said plate terminating short of the adjacent edge of the rib 36 to provide a second discharge opening 41. The upper section of the screening member carries upon its under face adjacent the upper edge thereof, a pair of depending perforated ears 42 disposed at the side edges and adapted to receive a horizontal pivot bar 43 upon which the screening member is rocked during the movement of the shaking mechanism, whose description now follows. This mechanism comprises a wedge-shaped member 44, pivoted at one corner of its base upon a pin 45 and provided at its opposite corner with a second pin 46 which projects through and beyond an arcuate slot 47 formed in the rear wall of the frame. The projecting end of the last mentioned pin is connected by a link 48 with the ends of a strap 49 which embraces an eccentric 50 carried by the drive shaft. The upper end or apex of said member contacts with an arcuate rib 51 secured to the under face of the rear side rail of the lower screening member 34 directly beneath the rib 36. By reason of this construction, it will be apparent that during the rotation of the drive shaft, the rocking member will oscillate upon its pivot 45 and, in consequence, will impart a sharp upward movement to the screening member as a whole by reason of its contact with the rib 51, thus effecting the requisite shaking movement of the screening member. In order to prevent interference with the screening member during such movement, that portion of the adjacent end wall of the machine is cut away, as shown in Figs. 1, 2 and 3.

The above described shaking movement of the screening member will have the effect of thoroughly agitating the nuts and shells which fall thereonto from between the grate bars and from the chute 52 which is secured to the frame wall 3 and overhangs the lower section of the screening member, the nuts falling through the meshes of the screen 38 upon the plate 40 from which they are discharged through the opening 41, while the shells which are too large to pass through the screen will be discharged through the opening 37, whence they fall onto a chute 53 located therebeneath and are thus discharged from the machine. The nuts which pass through the opening 41 fall upon a chute 54 and are discharged therefrom through an opening in the bottom wall 12 of the casing into a receptacle and are collected therein. It will be apparent, however, that the shells which are crushed by the action of the rubber are often broken into pieces small enough to permit their passage through the meshes of the wire screen 38 and their subsequent discharge through the opening 41 onto the chute 54. In order, therefore, to effect the separation of such pieces from the nuts, the invention contemplates the provision of a fan 55, which is located within the fan chamber 9 and is mounted upon a horizontal shaft 56, rotation of such shaft being effected by a belt 57 which passes around a pulley 58 mounted thereon and around a pulley 59 carried by the main drive shaft 5 adjacent the eccentric 50, the fan being partially closed by the casing 60 of its chamber, and its blast directed toward the chute 54 by means of upper and lower plates 61 and 62 respectively. The fan itself, as shown in Figs. 2 and 4 comprises a pair of circular disks 63 and 64 and a series of vanes 65 connecting the same, the first mentioned plate being provided with an inlet opening 66.

The rollers 31 which bear upon the longitudinal edges of the body portion 23 of the rubber are so mounted as to permit their adjustment, to compensate for wear, each roller to this end being carried by a strap 67, whose upper portion is provided with a vertical slot 68 through which a bolt 69 projects, the threaded stem of the bolt projecting through an opening formed in the rear wall 2 of the machine frame and being provided at such point with a tightening nut 70. It is therefore possible to lower any one of the rollers toward the rubber on becoming worn.

The grate upon which the rubber operates, is as obviously stated, located in the upper portion of the machine frame and rests upon longitudinally-disposed horizontal ribs 71 secured to the front and rear walls 1 and 2. Inasmuch, however, as the screen fabric 38 frequently becomes clogged by the nuts and crushed shells, it becomes necessary to remove the grate to permit access to the screen, and to this end the end wall 3 of the machine frame includes a hinged section 72 located adjacent the grate as shown in Figs. 2 and 3, said section being retained in closed position by a turn buckle 73. The opposite end wall 4 likewise includes a similarly located section 74 held in place by thumb screws 75, thus permitting the grate to be removed from either end, it being apparent that upon the removal of the grate, access may likewise be had to the ribs of the rubber, for cleaning purposes.

The operation of the machine is thought to be apparent from the foregoing description, it being understood that modifications and changes may obviously be made within the scope of the appended claims, the invention not being limited to the exact details of construction shown and described.

What is claimed is:

1. In a shelling machine, the combination of a horizontal grate; a rubber movable across the grate-bars and comprising front and rear members arranged in spaced relation to each other; a pivotally-mounted screen disposed beneath the grate; and means for rocking said screen upon its pivot.

2. In a shelling machine, the combination of a horizontal grate, a rubber movable across the grate-bars and comprising front and rear members arranged in spaced relation to each other; a chute carried by the rear member of the rubber for directing the material to be shelled into the space between said members; a horizontally-pivoted screen disposed beneath the grate; and means for rocking said screen upon its pivot.

3. In a shelling machine, the combination of a horizontal grate; a rubber movable across the grate-bars and comprising front and rear members arranged in spaced relation to each other; a chute carried by the rear member of the rubber for directing the material to be shelled into the space between said members; an upstanding shoulder formed upon one of said members; a drive shaft; a driving connection between said shaft and shoulder, for reciprocating said rubber; a horizontally-pivoted screen disposed beneath the grate; and means for rocking said screen upon its pivot.

4. In a shelling machine, the combination of a frame; a grate disposed therewithin; a reciprocatory rubber movable across the grate-bars and including a slotted body portion and a hopper mounted thereon; rollers carried by the frame and adapted to bear upon the upper face of said body portion at the longitudinal edges thereof, to hold the rubber against displacement during its movements; and a screen disposed beneath the grate.

5. In a shelling machine, the combination of a frame; a grate disposed therewithin; a rubber movable across the grate-bars; and a downwardly-inclined screening member disposed beneath the grate, said member comprising a solid upper section provided with longitudinal extensions adapted to form side rails, a rib connecting said rails, a screening fabric secured to the upper faces of said rib and rails, and a solid plate secured to the lower faces of said rails, said plate terminating short of said rib, to provide a feed opening.

6. The combination, in a shelling machine, of a frame; a grate disposed therewithin; and a rubber movable across the grate-bars, said rubber comprising a front member and a rear member having their mutually-adjacent inner ends arranged in spaced relation to each other, to provide an opening for the material to be shelled to pass to the grate.

7. The combination, in a shelling machine, of a frame; a grate disposed therewithin; and a rubber movable across the grate-bars, said rubber comprising a front member and a rear member having their mutually-adjacent inner ends arranged in spaced relation to each other, to provide an opening for the material to be shelled to pass to the grate, each member of said rubber having a series of transversely-disposed ribs secured to its under face.

In testimony whereof, I affix my signature, in presence of two witnesses.

ROBERT M. NEWLAND.

Witnesses:
CHAS. A. ALLEN,
JOHN E. BARBER.